Oct. 7, 1969

E. LAIMINS 3,470,738

COMPENSATION FOR VOLTAGE SENSITIVITY OF STRAIN GAGE TRANSDUCERS

Filed June 29, 1967

INVENTOR.
ERIC LAIMINS
BY
Thomson & Mrose
ATTORNEYS

United States Patent Office 3,470,738
Patented Oct. 7, 1969

3,470,738
COMPENSATION FOR VOLTAGE SENSITIVITY
OF STRAIN GAGE TRANSDUCERS
Eric Laimins, Belmont, Mass., assignor to BLH
Electronics, Inc., Waltham, Mass., a corporation
of Delaware
Filed June 29, 1967, Ser. No. 650,114
Int. Cl. G01b 7/16
U.S. Cl. 73—88.5                                8 Claims

ABSTRACT OF THE DISCLOSURE

Error-inducing voltage-sensitivity effect occurring in the strain gage circuitry associated with a transducer are offset by cooperating temperature-sensitive resistances, one of which is in intimate heat-transfer relationship with one of the transducer gages, and another of which is at a relatively remote location where it is responsive essentially only to the same ambient temperature conditions affecting the first resistance; both temperature-sensitive resistances being connected in the strain gage bridge circuitry to counteract output variations with changes in ambient temperatures and in strain gage heating.

BACKGROUND OF THE INVENTION

An electrical resistance strain gage transducer is designed to operate essentially as a ratio type device; therefore its so-called transfer function, usually expressed in volts or millivolts output change per volt input, is required to remain constant under given conditions and to be highly independent of the excitation voltage within a predetermined range. By way of example, this excitation voltage range for a 350-ohm bridge resistance may be between one and 20 volts AC, RMS, or DC, depending on the strain gage and transducer design, and the transfer function, which may be between 1 mv./v. and 4 mv./v. at rated capacity for bonded strain gage transducers, should remain substantially constant irrespective of what the excitation voltage may be within the relatively wide range of possible variations. Such a characteristic becomes very significant in applications where the excitation voltage is a function of a variable to be measured; in measuring shaft horsepower, for example, the excitation voltage is proportional to the shaft speed, whereas the transfer function of the torquemeter-type strain gage transducer is proportional to the applied torque. Similarly, in other commonly used strain gage transducer readout systems, such as those of the null-balance type where the output voltage from a transducer is compared with a calibrated reference voltage in the instrument, it is important that neither of the two compared sources vary its transfer function with changes in the excitation voltage. Power for such systems is usually drawn from commercial distribution lines exhibiting voltages varying as much as ±10% during a day, and, although the calibrated reference voltage in a null-balance instrument may be relatively unaffected by such line voltage variations, it has been found that the transducer transfer function does change and that its effect can exceed the allowable errors in precision systems such as electronic-type force measurement or weighing systems. This effect has been responsible for error measured at 0.0006 millivolt per one-volt change in the excitation voltage. Thus, in a transducer with a transfer function of 2 mv./m. at the rated capacity, and an excitation of 10 volts, such line voltage changes will result in a measurement error of 0.03% at the rated capacity and of 0.30% when operating at 10% of the rated capacity.

There are several factors contributing to the changes of a transducer transfer function with changes in excitation, the latter characteristic being termed voltage sensitivity. One such factor involves the relation between temperature of a resistance element, such as a resistance-type strain gage, and the electrical power input to it. In this connection equilibrium temperature of a bonded strain gage is not only a function of the square of the voltage across it, but is also affected by the heat transfer paths from the gage and by the characteristics of the heat sink created by the material underlying the gage. The heat transfer paths will be different if the strain gages have different current density, and if the thermal conductivity characteristics of the adhesive bonding and insulation of the strain gages are not exactly the same. Further, the transducer strain elements may be thermally unsymmetrical, with the heat dissipating characteristics for the strain gages being different for various strain gage locations. Another such factor involves the relation between thermal properties of the strain gage filament material, such as the coefficient of linear thermal expansion, and the different thermal properties of material to which these gages are bonded. As a result of such differences the temperature rise in a strain gage due to the power input will induce in it thermal stresses or strains which will also be a function of the thermal conductivity pattern in the entire strain gage matrix. It has been found that these thermal stresses or strains are different even for different gages in the same bridge circuit, and despite the most carefully executed transducer element designs and strain gage bonding processes. Such thermal strains are reflected in error-inducing change in resistance of a strain gage, and in the past, attempts have been made to reduce the effects of this undesirable and unavoidable characteristic by adjusting the temperature coefficient of resistance of the strain gage filament material to offset the resistance change due to a thermal strain. Some adjustment of the temperature coefficient of resistance for a strain gage filament material can be accomplished by work-hardening, and/or by thermal processing, though not to a degree of uniformity required for gages in a high precision transducer. A yet further factor contributing to changes in transducer transfer function with changes in excitation is associated with the fact that power input to a strain gage bridge will involve dissipations of heat in the transducer strain generating elements. Because of the resulting temperature increases, there will be dimensional changes in the transducer element, and, insofar as its mounting structure is prevented from expanding freely, related forces will be induced, and, consequently, stress or strain of such origins will promote erroneous signals from the strain gage bridge. If such signals are attributable to changes in excitation voltage, they wil not be compensated by techniques heretofore known in the art, and will also manifest themselves as voltage sensitivity. Although these signals are relatively low by other standards, a typical value for a 1000-lb. capacity load cell being 0.0005 mv./v. per a 15 volt change in excitation voltage, they cannot be tolerated in the truly high-accuracy weighing systems currently in demand for many purposes.

SUMMARY

In accordance with recognitions and related teachings of the present invention, voltage sensitivity of a strain gage transducer may nevertheless be reduced to a negligible value without involving serious complexities and costs. A preferred practice exploits one or more temperature-sensitive resistances to sense the temperature increase of one or more strain gages as they are brought about by changes in the electrical power supplied to the associated strain gage bridge. The resulting resistance change of the temperature sensitive resistance is exploited to introduce into the bridge circuitry signal voltages equal to and of opposite polarity to those resulting from the aforementioned voltage-sensitivity responses. A convenient practice involves the use of two like temperature-sensitive resistances, one of which is disposed to respond to the heating in one of the transducer bridge gages and the other of which is relatively remotely located for response only to the ambient temperature affecting the bridge as a whole, with these two temperature-responsive resistances being inserted into different bridge arms wherein they will effect cancellations of certain output variations with ambient temperature changes.

Accordingly, it is one of the objects of the present invention to provide novel and improved strain gage transducer apparatus of high precision in which voltage-sensitivity effects are automatically self-compensated by way of circuitry and components of simple low-cost form.

Another object is to improe voltage-sensitivity characteristics of strain gage transducer apparatus through use of temperature-responsive elements which are uniquely and critically located and connected, and which at the same time effect certain compensations for variations in ambient temperature conditions.

Although the features of this invention which are considered to be novel are set forth in the appended claims, further details as to preferred practices and as to the further objects and advantages thereof may be most readily comprehended through reference to the following description taken in connection with the accompanying drawings.

DESCRIPTION OF THE PREFERRED
EMBODIMENTS

Figure 1:
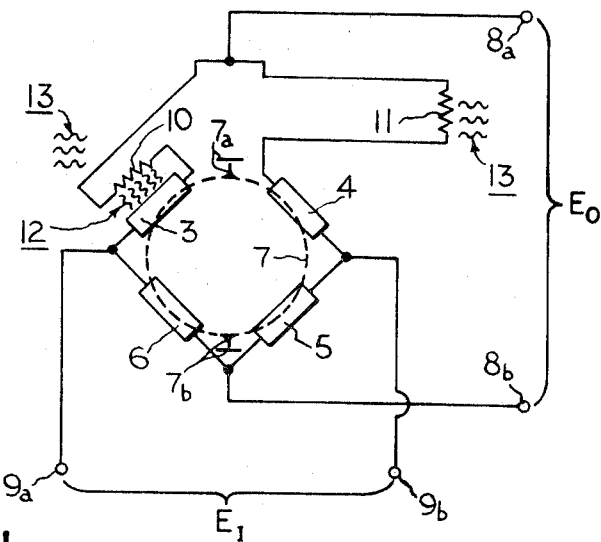
FIGURE 1 is a schematic diagram of an improved strain gage transducer arrangement incorporating temperature-sensitive resistances which offset unwanted voltage-sensitivity effects.

In FIGURE 1, an array of conventional strain-responsive gages 3 through 6 is represented in the usual association with a force-responsive transducer element 7, the latter being designated by dash lines which characterizes a form of the well-known ring-type transducer described in U.S. Patent No. 2,561,318. The diametrically-opposite load-transmitting portions 7a and 7b of that transducer serve to apply either tensile or compressive forces to the ring, and the strain gages 3–6 bonded to ring surfaces at quadrantally oriented positions are thus responsive to ring deformations and may be connected together in a special form of Wheatstone bridge network to yield electrical output signals identified by $E_O$ at terminals 8a–8b when the input terminals 9a–9b are properly excited by electrical input signals identified by $E_I$. The gages may be conventional resistance-wire or foil constructions, or of other known types, for example. Because of their associations with the bonding material and with the material of the transducer element to which they are affixed, among other things, these gages will tend to develop the unwanted and hitherto unresolved voltage-sensitivity effects referred to earlier herein. For purposes of offsetting such effects when the excitation signals $E_I$ change, the auxiliary resistances 10 and 11 are introduced into the transducer assembly as shown; both of these resistances are temperature-sensitive, and have substantially the same temperature characteristics and resistance values. The two auxiliary temperature-sensitive resistances are preferably disposed in adjacent arms of the bridge network, in the illustrated separate series relationships with the strain gages there, such that their respective influences on the output are normally mutually cancelling. One of these auxiliary resistances is critically disposed in a heat-exchange proximity with one of the gages which causes it to respond to dissipated heat in that gage; specifically, that relationship is depicted for the resistance 10 and gage 3, the lines 12 characterizing the heat exchange under discussion. The other auxiliary resistance, 11, on the other hand, is intentionally disposed at a location where it will not be directly affected by heat dissipated from any of the strain gages but will, nevertheless, respond to the same ambient temperature conditions to which the companion auxiliary resistance 10 is exposed in its cooperation with the transducer. Typically, resistance 10 is physically close to or even in superposed relation to gage 3, and resistance 11 is also within the usual transducer casing or housing (not shown) but at a position further removed from all of the gages. The heat-exchange relationships between both resistances 10 and 11 and their local ambient environment in the transducer assembly, as characterized by lines 13, are substantially the same, and hence any temperature variations affecting the transducer as a whole will cause both resistances to respond similarly and to leave the bridge output $E_O$ unaltered. This self-compensation is of course needed as an adjunct to the use of the one of the auxiliary temperature-sensitive resistance, 10, which serves specifically to affect the voltage sensitivity because of its response to heat dissipated from one of the gages, 3. As that resistance 10 is heated by the gage 3, its resistance is correspondingly altered and thereby modifies the bridge output $E_O$ in a sense and by an amount which accurately counteracts the bridge tendency to develop an output representing the aforesaid voltage sensitivity. In one practical embodiment, each of the strain gages 3 through 6 has been made of constantan filamentary material and exhibited a 350 ohm resistance, with each of the auxiliary temperature-sensitive resistances 10 and 11 being made of nickel and exhibiting a resistance of 18 ohms at room temperature. As is well known, of course, constantan (an alloy of about 40% nickel and the balance copper) is characterized by a negligible temperature coefficient of resistance, while nickel displays the more common resistance increases with temperature.

Figure 2:
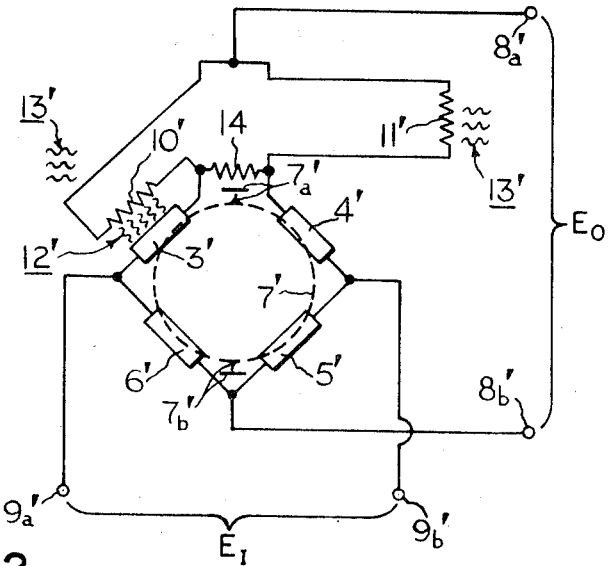
FIGURE 2 is a schematic diagram of an alternative strain gage transducer arrangement, generally like that of FIGURE 1, in which voltage-sensitivity compensations are modified by addition of a further resistance element.

The modification appearing in FIGURE 2 includes a further auxiliary resistance, 14 shunted across the two temperature-sensitive resistances 10' and 11' and placing them in a parallel-circuit relationship as shown. In other respects, the arrangement is like that of FIGURE 1 and, as a convenience, those features which are functionally the same as corresponding features in FIGURE 1 are simply identified by the same reference characters, with distinguishing single-prime accents being added. When the other resistance values are as specified with reference to FIGURE 1, the third auxiliary resistance 14 may be about 1 ±0.5 ohm and is of material, such as constantan, exhibiting a negligible temperature coefficient of resistance. Resistance 14 serves to modify the effects of the temperature sensitive resistances 10' and 11' and its selection represents a convenient means for adjustment for the compensation of voltage-sensitivity effects in the network.

Those versed in the art will appreciate that load cells and other forms of force transducers differing from the ring-type unit specifically discussed herein may usefully and beneficially exploit these teachings, and that the illustrated bridge network may be replaced by other known forms which will advantageously include the voltage-sensitivity compensation provisions of this invention. Although it is currently preferred that only one auxiliary temperature-sensitive resistance respond to heat dissipations by one of the strain gages, the improved results are obviously attainable through exploitation of more than one such resistance and/or associations with more than one of the strain gages; similarly, there may be more than one such temperature-sensitive auxiliary resistance which responds to ambient temperature conditions. The auxiliary temperature-sensitive resistance which responds to temperature of a gage may be combined into one unit with that gage. There are, of course, bridge network positions for these auxiliary resistances which are other than those illustrated and which will nevertheless yield the intended results in voltage-sensitivity compensations. Conventional input and output devices may be associated with the input and output, $E_I$ and $E_O$.

What I claim as new and desire to secure by Letters Patent of the United States is:

1. Force-responsive transducer apparatus including a strain sensitive element having electrical resistance strain gages with negligible temperature coefficient of resistance bonded thereto, a temperature sensitive resistance disposed for response to the heat dissipated by at least one of said strain gages, means connecting said strain gages in an electrical network arrangement including input connections for receiving applied electrical signals and output terminals for exhibiting electrical output signals related to forces applied to said element, said means including means connecting said temperature-sensitive resistance in position in said network where its resistance variations with heat dissipated by said one of said gages counteract the changes in said electrical output signals with changes in said applied electrical signals, said temperature-sensitive resistance being of resistance value and having a temperature coefficient of resistance which substantially offsets said changes in said electrical output signals from said network, whereby unwanted voltage-sensitivity responses of said apparatus are substantially eliminated.

2. Force-responsive transducer apparatus as set forth in claim 1 wherein said temperature-sensitive resistance is in proximity with said one of said gages, wherein said network comprises a Wheatstone bridge network, and wherein said means connecting said resistance in said network connects said resistance in an arm of said Wheatstone bridge network.

3. Force-responsive transducer apparatus as set forth in claim 2 wherein said resistance has a positive temperature coefficient of resistance, and wherein said connecting means connects said resistance in an arm of said network in series relationship with one of said strain gages.

4. Force-responsive transducer apparatus as set forth in claim 1 further comprising at least a second temperature-sensitive resistance disposed for response to the same ambient temperature conditions of the transducer apparatus which influence said first-named resistance and otherwise isolated from responses to heat dissipated by said gages, and means connecting said second temperature-sensitive resistance in position in said network wherein its resistance changes with said ambient temperature conditions counteract the changes in said electrical output signals with changes in resistance of said first-named resistance with said ambient temperature conditions.

5. Force-responsive transducer apparatus as set forth in claim 4 wherein said first-named temperature-sensitive resistance is in proximity with said one of said gages, wherein said second temperature-sensitive resistance is relatively remotely disposed in relation to said strain gages, wherein said network comprises a Wheatstone bridge network, wherein said means connecting said first-named resistance in said network connects said first-named resistance in an arm of said bridge network in series relationship with one of said strain gages, and wherein said means connecting said second temperature-sensitive resistance in said network connects said second resistance in another arm of said bridge network in series relationship with another one of said strain gages.

6. Force-responsive transducer apparatus as set forth in claim 5 wherein said first-named and second temperature-sensitive resistances have substantially the same resistance values and substantially the same temperature coefficient of resistance.

7. Force-responsive transducer apparatus as set forth in claim 5 wherein said first-named and second temperature-sensitive resistances are in adjacent arms of said bridge network and are of resistance value relatively low in relation to resistance values of said strain gages.

8. Force-responsive transducer apparatus as set forth in claim 7 wherein said first-named and second temperature-sensitive resistances are in arms adjacent to one of said connections and are each directly connected to one of said connections, and further comprising a third resistance having a substantially negligible temperature coefficient of resistance, and means connecting said first-named and second resistances in parallel through said third resistance, said third resistance being relatively low in resistance value relative to said first-named and second resistances and modifying the compensation for voltage-sensitivity effects by said parallelled resistances.

References Cited
UNITED STATES PATENTS

| | | | |
|---|---|---|---|
| 2,344,642 | 3/1944 | Ruge | 338—3 |
| 2,801,388 | 7/1957 | Ruge | 73—88.5 XR |
| 2,930,224 | 3/1960 | Bodner et al. | 73—88.5 |
| 3,290,928 | 12/1966 | Curry | 73—88.5 |

CHARLES A. RUEHL, Primary Examiner

U.S. Cl. X.R.

73—141